United States Patent [19]

Martin et al.

[11] Patent Number: 4,607,372
[45] Date of Patent: Aug. 19, 1986

[54] TECHNOLOGY OF ELECTRIC-FUSION OF GLASS

[75] Inventors: Bernard Martin, Levallois Perret; Gerard Dossier, Lesigny, both of France

[73] Assignee: Saint-Gobain Recherche, Aubervilliers, France

[21] Appl. No.: 652,574

[22] Filed: Sep. 20, 1984

[30] Foreign Application Priority Data

Sep. 20, 1983 [FR] France ................. 83 14903

[51] Int. Cl.⁴ .............................................. C05B 5/02
[52] U.S. Cl. .................................................. 373/41
[58] Field of Search ............... 373/39, 40, 41, 35, 373/33, 135, 120

[56] References Cited

U.S. PATENT DOCUMENTS

| | | | |
|---|---|---|---|
| 3,140,334 | 7/1964 | Penberthy | 373/41 |
| 4,282,393 | 8/1981 | Williamson | 373/41 |
| 4,410,997 | 10/1983 | Gell et al. | 373/41 |

Primary Examiner—Roy N. Envall, Jr.
Attorney, Agent, or Firm—Oblon, Fisher, Spivak, McClelland & Maier

[57] ABSTRACT

An electric fusion furnace for a vitrifiable charge wherein the fusion energy of the furnace is dissipated by the Joule effect in the molten mass, comprising a furnace having electrodes vertically disposed therein which are attached to the bottom of the hearth of the furnace and which are distributed regularly over the entire surface of the hearth in at least one ordered grouping of two rows with each row comprised of three equidistant electrodes powered in three respective phases designated as R, S, and T, wherewith the order of the phases in the two rows is inverted (R, S, T, and T, S, R), such that the two middle electrodes are in phase and the pairs of electrodes on the respective ends are in different phases, and wherewith the interelectrode distance in a given row is approximately equal to the distance between the two rows.

10 Claims, 10 Drawing Figures

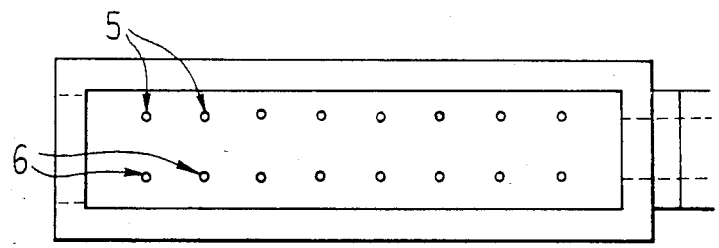
FIG_1a PRIOR ART
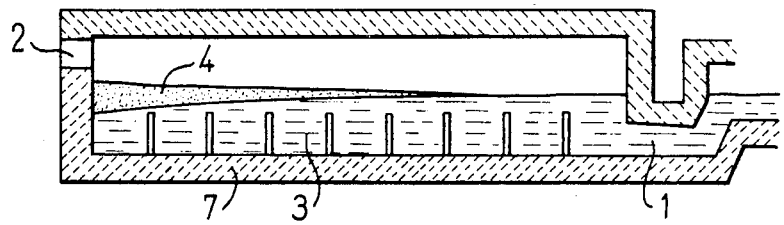
FIG_1b PRIOR ART
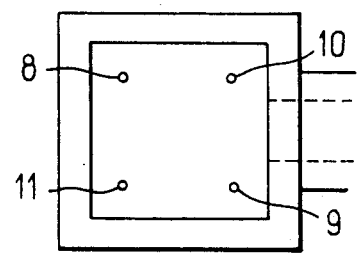
FIG_2 PRIOR ART
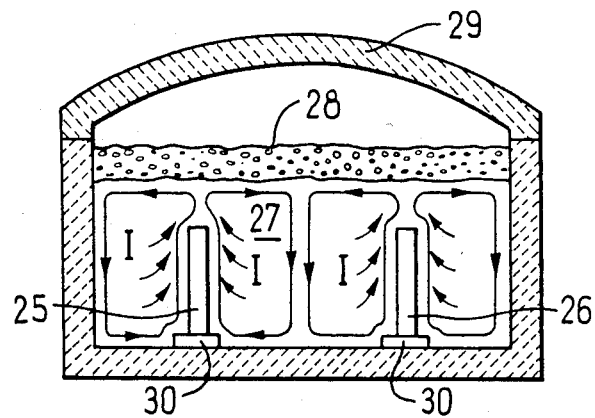
FIG_4

TECHNOLOGY OF ELECTRIC FUSION OF GLASS

BACKGROUND OF THE INVENTION

1. Field of the Invention

The invention relates to the technology of fusion of glass, and particularly to techniques wherein the conductivity of molten glass is utilized to develop the energy required for fusion, so that thermal energy is developed within the molten glass itself. More particularly, the invention relates to an electric fusion process wherein the current is supplied to the bath of molten glass by electrodes disposed vertically on the hearth of the fusion furnace.

2. Description of the Prior Art

Electrical energy is used for a wide variety of specific purposes in the fusion and refining of glass. In many cases this use of electrical energy is relatively peripheral. An example is local reheating of the bath of molten glass in order to promote certain convection patterns, to eliminate bubbles, or to improve temperature uniformity in large baths.

Outside of these very narrow specific cases, the use of electrical energy for fusion proper is often a mere adjunct of much earlier techniques wherein fusion is accomplished by means of burners. This is even more substantial when the production capacity is increased.

Despite a number of factors which are difficult to gauge and master, the experiences gained from burner-heated furnaces has yielded satisfactory process conditions with respect to product quality. Electric fusion technology has been developed with the focus on reproducing the conditions of burner-heated systems, even if this does allow advantage to be taken of the special characteristics of this new mode of furnace heating.

Large capacity burner-heated furnaces customarily are long and shallow. The charge of starting materials is introduced at one end of the furnace and the molten glass is withdrawn at the other. The thickness of the layer of charge over the bath, which varies as fusion proceeds, is on the average relatively small. The temperature varies widely in different regions of the bath, being low near the hearth and near the charging end, and being high at the surface and at the tapping end.

The choice of electric fusion substantially alters these conditions which are linked in one way or another to the use of burners and to the mode of heat transfer imposed by burners.

In particular, in an electric furnace with vertical electrodes, the charge of starting materials is incorporated in the bath of molten glass without lateral displacement of said charge over the surface of the bath, and the entire surface can be covered by the charge. In this case, if the entire surface is effectively involved in heat and mass transfers between the bath and the floating charge, one may substantially reduce the surface area of the electric furnace with respect to that of a furnace of the same capacity heater by burners.

The invention relates to this type of furnace in which the surface of the melt is covered by the charge of starting materials. This type of furnace is accordingly called a "cold arch" furnace. A need therefore continues to exist for a method by which an electrical fusion furnace can be more effectively used in the manufacture of glass.

SUMMARY OF THE INVENTION

Accordingly, one object of the present invention is to provide a more uniform distribution of the energy supply in the bath of an electric fusion furnace used in the manufacture of glass.

Briefly, this object and other objects of the invention as hereinafter will become more readily apparent can be attained by an electric fusion furnace for a vitrifiable charge wherein the fusion energy of the furnace is dissipated by the Joule effect in the molten mass, comprising, a furnace having electrodes vertically disposed therein which are attached to the bottom of the hearth of said furnace and which are distributed regularly over the entire surface of said hearth in at least one ordered grouping of two rows with each row comprised of three equidistant electrodes powered in three respective phases designated as R, S, and T, wherewith the order of the phases in the two rows is inverted (R, S, T, and T, S, R), such that the two middle electrodes are in phase and the pairs of electrodes on the respective ends are in different phases, and wherewith the interelectrode distance in a given row is approximately equal to the distance between the two rows.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1a and 1b are schematic representations of the traditional type of electric furnace, showing the disposition of the electrodes and the progress through the furnace of the starting materials which are introduced at one end. FIG. 1a is a top view and FIG. 1b is a longitudinal cross-sectional view;

FIG. 2 is a schematic top view of another traditional type of electric furnace wherein the charge is introduced uniformly over the entire surface;

FIG. 4 is a schematic cross section showing the type of vertical convection which agitates the bath in the furnaces according to the invention.

DETAILED DESCRIPTION OF THE PREFERRED EMBODIMENTS

Figure 3A:
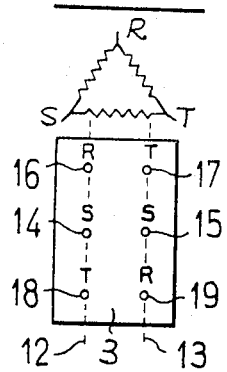
FIGS. 3a to 3e are top views of typical dispositions of the electrodes in an electric furnace according to the invention.

The literature in the area of technology of the present invention does, in fact, discuss the need for uniform heating of the molten glass bath. However this need is subordinate to the very particular conditions under which the heating is conducted.

This disposition of the electrodes on the hearth of a molten glass furnace is basically subject to various conditions some of which conflict. Thus, the conductivity of the molten glass imposes a minimum interelectrode distance in order to achieve the necessary power at current densities which are acceptable in practice at the electrode surfaces. Reducing the interelectrode distance effectively reduces the resistance, which for a given voltage increases the current density. For this reason, the number of electrodes (or groups of electrodes)

which can be disposed on a given surface area of the hearth is limited, which is in conflict with optimum distribution of the zones of the bath which act as heat sources.

Another conflict is that whereas industrially it is economical to employ 3-phase current, past practice involving research on the equilibrium of the phases seems to impose a triangular or hexagonal disposition of the electrodes, which is not very compatible with a uniform distribution of electrodes in a rectangular furnace.

The invention relates to a technique of electric fusion by means of 3-phase current employing a furnace wherein the electrodes are distributed regularly over the entire surface of the hearth in at least one ordered grouping comprised of two rows with three equidistant electrodes powered in the three respective phases (designated R, S, and T), wherewith the order of the phases in the two rows is inverted (R, S, T, and T, S, R), such that the two middle electrodes are in phase and the pairs of electrodes on the respective ends are in different phases, and wherewith the interelectrode distance in a given row is approximately equal to the distance between the two rows.

In a preferred embodiment, the electrodes are disposed in an even number of rows of three electrodes each forming the ordered groupings (R, S, T; T, S, R), wherewith the said groupings are disposed such that the electrodes of two neighboring rows in two such neighboring groupings are in the same order, i.e., R, S, T; R, S, T.

If the furnace according to the invention is comprised of three rows of electrodes, the order of the phases of the electrodes in these rows is (R, S, T; T, S, R; R, S, T).

In the case of an odd number of rows greater than three, the preferred disposition is that of even groupings plus an additional middle row wherein the order of the phases is the reverse of that in the two neighboring rows.

In the furnace according to the invention, the distance between two neighboring ordered assemblies is preferably equal to the distance between rows of the same grouping or assembly.

The disposition of electrodes as just described above corresponds to a furnace wherein there may be as many rows of electrodes as required by the production capacity envisaged. For the reasons indicated supra, it is preferable for the furnace not to be greatly longer than it is wide. Thus, for very large capacity furnaces it appears preferable not to continue to increase the number of rows placed side by side, but to extend the length of the rows by a new series of three electrodes. In this case in order to maintain the equilibration of phases, it is preferable to limit the interaction between series of three electrodes with a row by inverting the order of phases in successive series of three electrodes within a row, e.g., R, S, T; T, S, R; R, S, T; . . . .

It is particularly advantageous for the number of groupings in the array to be 1, 2, 4, 6, 8, or 9. Greater numbers are conceivable, but under the operating conditions considered, such greater numbers would correspond to production rates in excess of those employed in practice.

In actual tests, when electrodes were disposed in a hearth in the manner described, it was surprisingly found that the equilibrium between the phases could be maintained very satisfactorily. The indicated disposition of electrodes enable such equilibriums to be provided at the 95% level or higher.

Independently from the preceding discussion, the present invention is distinguished by the fact that the interelectrode distances are relatively small, taking into account the surface area of the furnace. Consider the distance d separating the electrodes between which the currents are established. In a complex array of electrodes, it is sufficient to examine the nearest neighbor interacting electrodes. Distance considerations are related to the available power. For a given voltage, the power is inversely proportional to the resistance of the bath, which in turn depends on the interelectrode distance. Where the power dissipated by each electrode (or group of electrodes) is largely uniform (which condition is connected with the equilibration of the phases discussed supra) over the entire bath, each electrode may be considered to participate in heating a fractional share of the bath. If S is the total surface of the bath, the said fractional share corresponds to a part of the bath with surface area S/n, where n is the total number of electrodes (or the total number of groupings of electrodes) in the array in the furnace.

Homogeneity of energy delivery is favored by and to the extent that: (a) The fraction of the surface area of the furnace heated by each electrode is minimized; and (b) The distance between the interacting electrodes is maximized.

To express the relation between these two contradictory conditions, it is convenient to consider the expression $n \cdot d^2/S$.

According to the invention (d being in m and S in $m^2$), this ratio is advantageously between 0.4 and 1.4, and preferably—particularly for high capacity furnaces—between 0.6 and 1.25.

There are other parameters which might be employed to express the advantage of the inventive disposition of the electrodes, but all relate to (and essentially reduce to) this improvement in the homogeneity of the bath.

In this connection, experimental studies have shown that the Joule effect energy dissipated is localized near the electrode. Four-fifths of the energy is developed in a zone around the electrode which to an approximation may be considered as homogeneous. For a vertical cylindrical electrode, this zone corresponds approximately to a cylinder with diameter three times that of the electrode. As the interelectrode distance is reduced, it is seen that in general these heat source zones occupy a greater fraction of the bath, and that therefore, up to a point, fusion may be achieved at a lower average temperature.

These improvements have a favorable effect on operating conditions. Thus, for example, the availability of increased power per unit surface area of the furnace enables much greater production per unit surface area than with analogous prior art furnaces. Outputs of $4 \times 10^3$ kg/$m^2$ per day are easily attainable, and even in some cases greater than $6 \times 10^3$ kg/$m^2$ da.

In this context it must be stressed that production capacity per unit surface area is only useful as a basis of comparison for analogous operating conditions, in particular for identical operating temperatures. (In the following discussion there is a more detailed discussion of the temperature characteristics of the invention.) In general, operating at increased temperature enables increased production rate. Such an intensified operation is not always desirable, however, for numerous reasons, which among them are the detrimental effect on the service life of the furnace refractories and the electrodes. A given furnace operated at a higher temperature has a shorter life (on a total product tonnage basis) than if it were operated at a lower temperature. Another consideration against higher temperature operation is the increase in specific energy consumption as temperature is increased.

The invention thus makes it possible to construct a furnace with small dimensions and high production capacity.

It has also been surprising to find that the furnaces according to the present invention permit great latitude in operating parameters. Whereas it is advantageous to have high production capacity, it is also advantageous to be able to operate the furnace at a low level of production if necessary. In this regard the present furnaces represent an advance over previous furnaces. It is possible to reduce production to one sixth of the maximum, or even less, without risk. This operating flexibility is due in part to improved distribution of the heat sources in the interior of the molten glass, which is reflected in a high degree of temperature uniformity throughout the bath, regardless of the average temperature regime of operation.

The reduction of temperature deviations within the bath enables minimization of the average temperature, whereby the rate of fusion of the charge is reduced, thus reducing the production rate.

In practice, any means of reducing thermal losses in the molten bath acts to limit temperature deviations and thus enables further reduction of the production rate in the low range.

If the thickness of the charge is increased without decreasing the volume of molten material, this reduced thermal loss regime of operation is favored.

More generally, other conditions being equal (in particular, the production rate and the charge of starting materials), the mean temperature of the bath may be reduced by several degrees or several tens of degrees with respect to the prior art.

With lower average temperature, the resulting thermal losses and specific energy consumption are lower. This reduction may amount to 8%; most commonly it will be in the neighborhood of 4 to 5%.

Other dispositions are also favorable to improve the performance of furnaces according to the invention.

In order to limit electrode current density, it is desirable that the electrodes have a sufficiently large contact surface with the glass. Since the length of the electrodes is limited (discussed further infra), and their diameter is limited for practical reasons, an advantageous means of achieving high current is to replace a single electrode by a group of electrodes (usually two or three). In such a replacement, the electrode distance is preferably not large with respect to the distance between neighboring interacting groups. Preferably, the interaxial distance for electrodes of the same group is not less than the radius of an electrode, nor is it greater than eight times the diameter of an electrode, and more preferably it is not greater than six times said diameter.

The reduction of the current density at the electrode surfaces leads to a reduction of the temperature at said surfaces, which enables their erosion in contact with the glass to be reduced. At the same time, for a given quantity of energy supplied to the molten glass, the glass temperature is locally higher.

To avoid problems of corrosion of the hearth refractory, each electrode or group of electrodes is preferably disposed on a base extending from the hearth. In this way any accentuation of local convection movement at the base of the electrode is avoided, movement which tends to erode the hearth refractory. The refractory material of the said base is advantageously a material which is more resistant to erosion than the refractory of which the furnace hearth is comprised.

The upper ends of the electrodes are disposed at a distance from the contact surface between the molten glass and the charge. In this way one avoids development of increased local fusion above the electrode, which condition would be contributed to by a locally higher temperature. Convection is particularly intense along the electrode because of the temperature gradient between the electrode and the adjoining bath. If the top end of the electrode is immersed sufficiently deeply, the ascending convection current of glass which is developed along the electrode will transfer heat and momentum to a sufficient quantity of neighboring glass as it travels between the end of the electrode and the boundary of the molten bath so that the instantaneous temperature deviation which would have occurred will be reduced, and the surface area of charge which the said flow current passes by will be increased. The zone of accentuated fusion above the electrode is then relatively large. In the opposite situation, where the end of the electrode is close to the boundary between the bath and the charge layer, rapid fusion is brought about on a small area of the surface, resulting in the formation of craters on the charge layer, which craters may extend through said layer if the layer is not very thick. This phenomenon is disadvantageous. In addition to the irregularity in the fusion, the insulation created by the surface layer is interrupted. Thus, the end of the electrode is advantageously disposed at a sufficient distance from the bath-charge interface that the temperature of the convection current at the level of the top surface of the bath is not excessive relative to the average temperature on the entire surface.

In practice it is advantageous to ensure that the distance between the end of the electrode and the interface between the glass bath and the layer of vitrifiable materials being transferred is at least one-sixth of the depth of the glass bath. Of course, the level of the surface of the molten glass can vary as operating conditions vary, (for example, to increase the production rate the temperature is increased and the glass level in the furnace is lowered). Therefore, the length of the electrode must be based on the lowest anticipated level of the bath-charge interface.

FIGS. 1a and 1b together show the configuration of a large capacity furnace adapted from earlier burner-heated furnaces. Such furnaces are distinguished in particular by a highly elongated shape. The fusion bed is typically more than three times longer than it is wide.

This configuration is chosen to facilitate a movement of the bath such that overall its properties are modified in such a way that the glass withdrawn at the level of the subsurface channel 1 is homogeneous.

The invention will now be described in more detail with reference to the drawings.

In such a furnace, the charge of vitrifiable materials is introduced at opening 2 disposed at one end of the furnace. This charge is deposited on the molten bath 3, forming a layer 4 thereon. This layer diminishes in thickness following the entrance opening, as the materials of which the layer is comprised are progressively fused. The said layer may extend to the other end of the furnace at which the channel 1 is disposed. The submersion of channel 1 prevents the material arriving at this other end still unfused from passing on through said channel.

Electric heating of this type of furnace establishes conditions analogous to those obtained in burner-heated furnaces. In the furnace type shown in FIGS. 1a and 1b, the electrodes (5, 6) are disposed regularly over the hearth 7 of the furnace. These electrodes are associated in pairs, one member of the pair being on either side of the furnace. They are powered with, e.g., monophase current. The power to each pair of electrodes (5, 6) may be separately regulated, so that the temperature conditions may be varied according to the given zone of the furnace.

In general, such furnaces are relatively highly space-consuming, and have high energy consumption.

FIG. 2 shows a square electric fusion through, which permits reduction of thermal losses through the walls. The dimensions of this type of furnace are ordinarily less than those of the furnace of FIGS. 1a and 1b. The charge of starting materials is normally uniformly distributed over the surface of the molten bath, and an effort is made to keep the bath temperature, in particular the temperature of the bath contacting the layer of starting materials, at a level such that the process of fusion of this layer is uniform over the entire surface. Toward this end, the electrodes (8, 9, 10, and 11) are disposed symmetrically, and the electric power supply (by monophase or diphase current) is such that each electrode dissipates power uniformly, i.e., at the same rate as each other electrode.

In this prior art mode, the interelectrode distance is relatively great, the heating of the bath is not sufficiently uniform, and the specific energy consumption is still too high.

FIGS. 3a to 3e show typical electrode dispositions in the electric fusion furnaces according to the invention. For simplicity, these Figures show only the limits of the molten bath 3 and the implantation of the electrodes on the furnace hearth. The connections to the three-phase delta power supply are indicated by the symbols R, S, and T given to electrodes in the respective phases.

FIG. 3a shows the smallest grouping corresponding to the invention. In this configuration, six electrodes are arranged in two columns (12 and 13). The three electrodes in each coloumn are powered in the three respective phases. The two middle electrodes (14 and 15) are in phase. The neighboring end electrodes in the two columns (16 and 17) and (18 and 19), are in different phases, i.e., 16 different from 17, 18 different from 19. In the preferred embodiment shown, the interelectrode distances within a column and between columns are all equal.

In a furnace with this configuration, the principal interactions between electrodes will obviously be between nearest neighbor electrodes. Electrode 16 will interact with electrodes 14 and 17, and to a lesser degree with electrode 15; electrode 14 will interact with electrodes 16 and 18, and to a lesser degree with electrodes 17 and 19, and so on.

Experience has shown the remarkable fact that, even though the electrodes are not disposed in a triangle or at the apices of a regular hexagon, the current in each phase and the energy dissipation around each electrode are well equilibrated. The deviation does not exceed 5%, and can be below 3%. In other words, it turns out that when the electrodes are distributed uniformily, over the hearth, the bath 3 is heated in uniform fashion. Such a configuration is thus well suited to fusion of a charge deposited over the entire surface of the bath 3.

In a furnace having this configuration, the molten glass may be equally well withdrawn from any of the subsurface faces. Preferably, the tapping channel is disposed on an axis of symmetry of the bath 3.

Figure 3B:
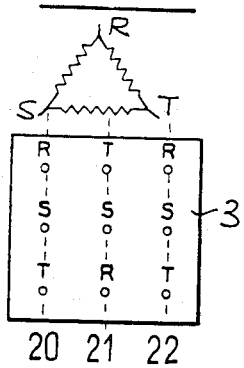

FIG. 3b shows a configuration analogous to that of FIG. 3a but with three columns of electrodes (20, 21 and 22). The power supply to the first two columns is as shown in FIG. 3a, and that to the third column (22) is the same as to the first (20).

Despite the fact that this configuration is closer to close-packed, it is less well equilibrated than the preceding configuration. Still, the deviation in current from phase to phase is not ordinarily greater than 5%.

Figure 3C:
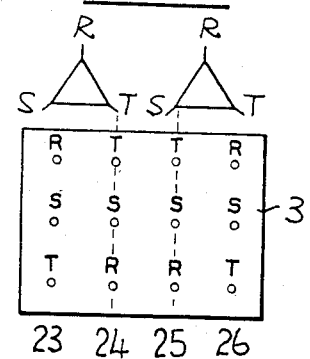

FIG. 3c shows a configuration comprised of 4 columns (23, 24, 25, 26) which corresponds to a doubling of the configuration of FIG. 3a with the columns disposed symmetrically in pairs such that the lateral neighbors in columns 24 and 25 are of the same phase. With this configuration, each lateral half is practically independent of the other, particularly when, as shown, each is powered by its own separate transformer. The interactions between the two lateral halves are very limited. The array is very well equilibrated.

Figure 3D:
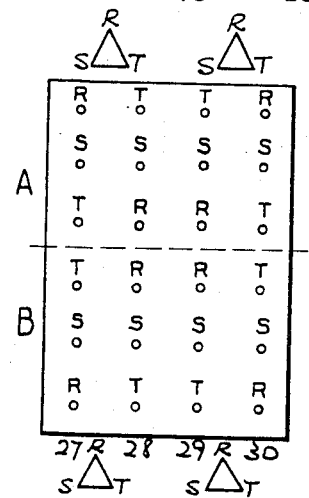
Figure 3E:
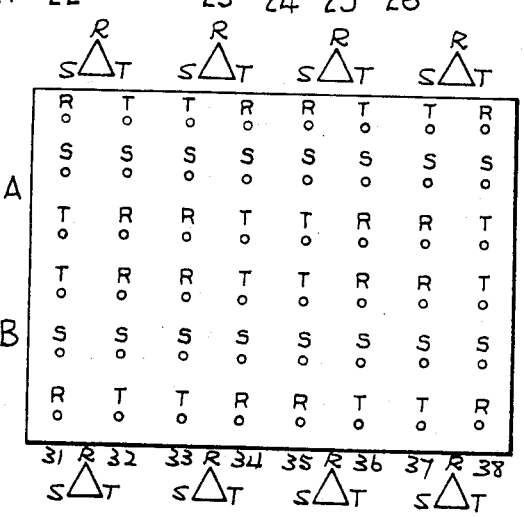

FIGS. 3d and 3e show groupings with an even greater number of electrodes. The columns 27 through 38 here are twice as extensive as in the preceding examples, with 6 electrodes in each column. The phases within a column are arranged symmetrically as above i.e., around a plane of symmetry between the two halves, A and B, wherewith each half (A, B) functions practically independently of the other.

Figure 5:
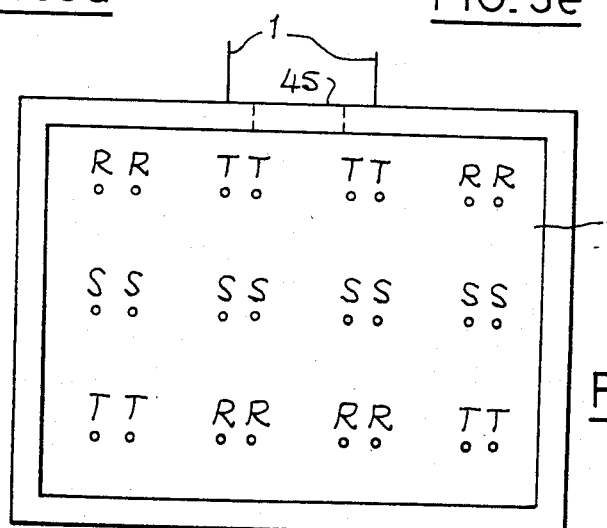
FIG. 5 is a schematic top view of the disposition of pairs of electrodes in a furnace according to the invention.

The configuration of the furnace containing melt 3 shown in FIG. 5 is analogous to that of FIG. 3c, but the individual electrodes of FIG. 3c are replaced by three pairs of electrodes in each column 39, 40, 41 and 42. The electrodes of each pair are sufficiently close to act practically as a single electrode with respect to the other pairs of electrodes. Further, lines 1 identify the exit channel from the furnace similar to what is shown by the same reference numeral in FIG. 1b, while dashed lines 45 denote the opening in the furnace wall through which molten glass flows from the furnace into the channel.

In FIGS. 3 and 5 the three-phase delta power supply transformers are represented schematically by small triangles. These triangles are disposed opposite specific groups of electrodes. The power supply circuit arrangements shown are preferred, but others are equally possible, particularly to accommodate the powers of the transformers employed.

FIG. 4 illustrates the behavior of the molten bath 3 heated by vertical electrodes. The furnance is shown in cross section at two electrodes (25, 26). The bath of molten glass 27 is covered with a layer 28 of vitrifiable material which is continually replenished in customary fashion by a mobile charging system (not shown) which distributes material over the entire surface, in a complex repetitive trajectory.

The space separating the layer of charge material 28 from the arch 29 of the furnace can be relatively limited, but must be sufficiently high to permit passage of the charging device.

In the bath 27, the electrodes 25 and 26 act as sources of heat, as we have seen supra, and give rise to convection currents (represented in FIG. 4 by loops with arrows). Only the general direction of these currents is indicated. In the flow pattern there is rising motion along the electrodes. The heated glass then flows along the interface between the molten bath and the floating layer 28 and then back downward either along the wall or in the middle zone of the furnace. Secondary induced flows of greater or lesser intensity accompany this principal flow pattern. For example, the arrows I indicate general the direction of these induced currents in the neighborhood of the rising currents.

The base of each electrode is protected from erosion by a base structure 30 comprised of a particularly erosion-resistant refractory material.

Having now generally described the invention, a further understanding can be obtained by reference to a specific example which is provided herein for purpose of illustration only and is not intended to be limiting unless otherwise specified.

The following example of application of the present furnace configuration relates to an electric fusion furnace for the production of insulating fibers. Glass produced for this purpose does not require a high degree of refining. In this type of application, the glass leaving the furnace is sent directly to the fiber manufacturing machines.

The glasses used for this type of application typically have the following general composition: $SiO_2$, 60 to 67 wt. %; $Al_2O_3$, 3 to 5 wt. %; $Na_2O + K_2O$, 16 to 20 wt. %; CaO, 6 to 9 wt. %; MgO, 0 to 4 wt. %; $B_2O_3$, 0 to 5 wt. %; plus variable amounts of MnO and BaO, and traces of other elements. In addition, the glasses may be comprised of fluorine in amounts generally not exceeding 4 wt. %.

As is well known, fluoride ion facilitates the fusion of vitrifiable materials. Contrary to what is observed with traditional fusion employing a flame, the presence of fluoride ion in an electric furnace does not pose problems of atmospheric pollution, because of the very low emissions from such a furnace.

The charge of raw materials employed to produce glass of the composition indicated is comprised of: sand, feldspar, borax, sodium carbonate, dolomite, limestone, and fluorspar.

The charge is introduced and intimately mixed. It may be calcined beforehand to remove any water content.

The fusion is carried out in a furnace of the type represented in FIG. 5.

The surface of the hearth of the furnace is 48 m² (6 m×8 m). The depth of the bath can be varied to suit conditions. The maximum depth is 1.6 m and the minimum, taking into account the length of the electrodes which is a limiting factor, is 1.10 m.

The electrodes are comprised of molybdenum and have a diameter of 70 mm. They are in contact with the bath over a length of about 800 mm, which may be modified by ±200 mm if the need arises.

The available network power is on the order of 11,000 kVA. The losses in the transformers and connections reduce usable power to about 10,500 kVA. The voltage available to each phase is controllable, with the maximum being 200 V.

Depending on the available power, the maximum production capacity of the furnace has been established at about 220 metric tons per day, or about 4.5 metric tons per square meter per day.

For the highest production rate, the temperature of the molten mass of glass at the outlet from the furnace has been established to be approximately 1450° C., and the specific energy consumption is on the order of 850 kWh per metric ton of glass produced.

The furnace may also be operated without difficulty in a low output regime which is on the order of 1 metric ton per square meter per day, or less.

For a production rate of 50 tons metric per day, the glass temperature at the furnace outlet is not greater than 1250° C. Under these conditions the energy consumption is on the order of 950 kWh per ton.

The energy consumption values were obtained with the above-stated composition with 10% waste glass scrap (cullet) added.

The above results are remarkable, particularly for the lower specific energy consumption and the low operating temperature, taking into account the quantity of material fused. The energy savings achieved by this furnace over analogous prior art furnaces (for the same production level) are greater than 6% regardless of the production rate regime chosen.

Further, the furnace according to the invention enables low output operation at a much lower level than possible with analogous prior art furnaces.

These improvements are attributable to the particular structure of the furnace, is clearly self evident. In particular, the interelectrode distance is 1.9 m, which corresponds to the ratio $nd^2/S = 12(1.9)^2 \times 48 = 0.9$.

Another advantage of the furnace according to the present invention is linked to the lower operating temperature for equivalent production, whereby the erosion of the refractories and the electrodes is greatly reduced. Thus, the important economic characteristic of furnace operating life is particularly advantageous in the case of the invention.

Having now fully described the invention, it will be apparent to one skilled in the art that many changes and modifications can be made thereto without departing from the spirit or scope of the invention as set forth herein.

What is claimed as new and is intended to be secured by Letters Patent is:

1. An electric fusion furnace for a vitrifiable charge wherein the fusion energy of the furnace is dissipated by the Joule effect in the molten mass, comprising:
   a furnace having electrodes vertically disposed therein which are attached to the bottom of the hearth of said furnace and which are distributed regularly over the entire surface of said hearth in at least one ordered grouping of two rows with each row comprised of three equidistant electrodes powered in three respective phases designated as R, S, and T, wherewith the order of the phases in the two rows is inverted (R, S, T, and T, S, R), such that the two middle electrodes are in phase and the pairs of electrodes on the respective ends are in different phases, and wherewith the interelectrode distance in a given row is approximately equal to the distance between the two rows.

2. The furnace of claim 1, wherein said electrodes are disposed in an even number of rows of three electodes each, forming the ordered groupings (R, S, T; T, S, R), said groupings being disposed such that the electrodes of two neighboring rows in two neighboring groupings are in the same non-inverted order.

3. The furnace of claim 2 wherein the distance between two neighboring rows of two neighboring ordered groupings of electrodes is equal to the distance between rows within a grouping of electrodes.

4. The furnace of claim 1, which has three rows of electrodes, with the order of the phases of the electrodes in these rows being (R, S, T; T, S, R; R, S, T).

5. The furnace of claim 1, which has rows of electrodes each comprised of a multiple of three electrodes, wherein the order of phases in successive series of three electrodes within a row is inverted.

6. An electric fusion furnace for a vitrifiable charge, wherein the fusion energy is dissipated by the Joule effect in the molten mass, comprising:

electrodes disposed vertically on the hearth bottom of the furnace, which electrodes are supplied with 3-phase current;

said electrodes being distributed regularly over the entire surface S of the hearth, wherewith the minimum separation distance d of interacting electrodes is such that the value of $nd^2/S$ is between 0.4 to 1.4, and n is the number of electrodes or groups of electrodes.

7. The furnace of claim 6, wherein the value of $nd^2/S$ is between 0.6 and 1.25.

8. The furnace of claim 1, wherein the minimum production rate of said furnace in a low output regime is less than one-sixth the maximum production rate.

9. The furnace of claim 6, wherein the minimum production rate of said furnace in a low output regime is less than one-sixth the maximum production rate.

10. The furnace of claim 1, wherein the electrodes comprise groups of identical cylindrical electrodes, with the distance between two neighboring electrodes in a group being at least two and at most eight times the diameter of an electrode.

* * * * *